(12) United States Patent
Ryland (10) Patent No.: US 8,344,934 B2
(45) Date of Patent: Jan. 1, 2013

(54) SYNTHETIC APERTURE RADAR (SAR) IMAGING SYSTEM

(75) Inventor: Robert Ryland, Silver Spring, MD (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 283 days.

(21) Appl. No.: 12/913,130

(22) Filed: Oct. 27, 2010

(65) Prior Publication Data

US 2012/0105276 A1 May 3, 2012

(51) Int. Cl.
*G01S 13/90* (2006.01)

(52) U.S. Cl. .............. 342/25 A; 342/25 F; 342/179

(58) Field of Classification Search .......... 342/25 R, 342/25 A–25 F, 179
See application file for complete search history.

(56) References Cited

U.S. PATENT DOCUMENTS

| | | | | |
|---|---|---|---|---|
| 5,736,958 | A * | 4/1998 | Turpin | 342/179 |
| 5,751,243 | A * | 5/1998 | Turpin | 342/179 |
| 6,697,010 | B1 * | 2/2004 | Lam | 342/25 R |
| 7,961,134 | B2 * | 6/2011 | Ranney et al. | 342/25 R |
| 2010/0141508 | A1 * | 6/2010 | Nguyen et al. | 342/25 F |
| 2012/0105276 | A1 * | 5/2012 | Ryland | 342/25 F |

OTHER PUBLICATIONS

Whitcomb, J.; Moghaddam, M.; McDonald, K.; Podest, E.; Kellndorfer, J.; , "Wetlands map of Alaska using L-Band radar satellite imagery," Geoscience and Remote Sensing Symposium, 2007. IGARSS 2007. IEEE International , vol., no., pp. 2487-2490, Jul. 23-28, 2007.*

* cited by examiner

*Primary Examiner* — John B Sotomayor
(74) *Attorney, Agent, or Firm* — Tarolli, Sundheim, Covell & Tummino LLP (57) ABSTRACT

One embodiment of the invention includes a synthetic aperture radar (SAR) system including a receiver configured to receive a plurality of reflected radar pulses corresponding to a plurality of radar transmission pulses having been reflected from a target region. A processing controller divides the target region into a plurality of tiles at a highest data layer and each of the plurality of tiles into a plurality of sub-tiles corresponding to one of a plurality of data layers and iteratively processes a portion of pulse data corresponding to a given tile associated with a higher data layer to generate pulse data corresponding to a given sub-tile in a lower data layer. An image processor is configured to generate a radar image of the target region based on the pulse data corresponding to each of the plurality of sub-tiles associated with a lowest data layer of the plurality of data layers.

20 Claims, 8 Drawing Sheets

SYNTHETIC APERTURE RADAR (SAR) IMAGING SYSTEM

TECHNICAL FIELD

The present invention relates generally to radar systems, and specifically to a synthetic aperture radar (SAR) imaging system.

BACKGROUND

Since the early 20$^{th}$ century, experimentation has been conducted with radio waves as a means to detect distant targets of interest. Radar systems have developed from simple detection and ranging systems to essential systems on board aircraft and ships, and more recently to highly sophisticated space surveillance and imaging systems. Radar technology has followed, and in many cases driven, the advances in high-frequency electronic systems, digital processing, and computing. Most radar systems employ distinct but collocated transmitter and receiver electronics, as is explained in elementary radar systems textbooks. A modern aircraft or ship may have multiple radar systems of this type, for detecting and ranging airborne vehicles, marine vessels, and/or weather phenomena.

As radar technology has improved, radar based systems have been designed and implemented to provide critical imaging information regarding a target object or target area, particularly in scenarios where visible detection or visible images are not available or are not satisfactory. Signal parameters such as amplitude, time-delay, carrier-frequency, and modulation type are known to affect the performance of simple radar systems and advanced radar based imagery systems using synthetic aperture radar (SAR) techniques. In SAR systems, the motion of the platform hosting the radar transmitter is used to synthesize a much larger antenna aperture, consequently resulting in a higher resolution than is possible with the smaller physical aperture used in typical radar systems. The characteristics or parameters of radar signals that are reflected from a target object can be employed to provide imagery of the target. Because these images are generated from radio frequency (RF) waveforms as opposed to visible light, radar images can typically be obtained in poor weather or when the target is obscured by foliage, fog, or cloud cover.

In basic terms, SAR systems employ modulated pulse Doppler radar signals. Reflected signals from suitable radio-wave reflective targets can be processed to create a radar image that can often be distinct from an image obtained from a visible light based system. An SAR system typically uses the monostatic return from a target, which requires the radar receiver to be collocated, or nearly collocated, with the radar transmitter. As such, the SAR system can be located on a single platform in motion, such as an aircraft or orbiting satellite. In a bistatic or multistatic radar systems, the radar transmitter and the one or more radar receivers can be significantly separated in space, such that they can be located on separate and distinct platforms.

The performance of typical SAR systems can be characterized by examining an ambiguity function of the transmitted radar signal. The ambiguity function of the radar signal is related to the autocorrelation of the signal as a function of system parameters, time delay, and Doppler frequency shift. Ideally, the ambiguity function can be plotted as a narrow spike centered at the origin, with limited energy content along both the time and Doppler axis. Errors in interpreting the radar signal parameters in the pulsed radar signals, as reflected from the target object or terrain, can result in artifacts and degraded resolution that can affect the processed radar image. Radar signals, including linear frequency modulated (FM) chirp pulse trains employed in SAR systems, may have limited bandwidth and time duration, such that the fundamental radar system performance can be compromised. The critical parameter of time-bandwidth product (TW) for a linear frequency modulated chirp is constrained by radar system design factors, such as ambiguous range, peak pulse power, and coherent bandwidth of the RF electronics. Accordingly, radar images may be generated without significant clarity or resolution.

SUMMARY

One embodiment of the invention includes a synthetic aperture radar (SAR) system. The system includes a radar transmitter configured to generate a plurality of radar transmission pulses and a radar receiver coupled to a radar aperture and configured to receive a plurality of reflected radar pulses corresponding to the plurality of radar transmission pulses having been reflected from a target region. The system also includes a processing controller configured to divide the target region into a plurality of tiles and to process a portion of the plurality of reflected radar pulses to generate pulse data corresponding to a respective one of the plurality of tiles in a highest data layer of a plurality of data layers. The processing controller also conducts a plurality of iterations, each corresponding to one of the plurality of data layers, of dividing each of the plurality of tiles into a plurality of sub-tiles corresponding to a lower data layer and to recursively process the pulse data associated with each of the plurality of tiles in a higher data layer to generate pulse data corresponding to each of the plurality of sub-tiles of the lower data layer. The system also includes an image processor configured to generate a radar image of the target region based on the pulse data corresponding to each of the plurality of sub-tiles associated with a lowest data layer of the plurality of data layers.

Another embodiment of the invention includes a method for imaging a target region based on SAR. The method includes generating a plurality of radar transmission pulses and receiving a plurality of reflected radar pulses at a radar aperture. The plurality of reflected radar pulses correspond to the plurality of radar transmission pulses having been reflected from the target region. The method also includes dividing the target region into a plurality of tiles associated with a highest data layer of a plurality of data layers and generating pulse data corresponding to a respective one of the plurality of tiles in the highest data layer based on a portion of the plurality of reflected radar pulses. The method also includes repeatedly dividing each of the plurality of tiles into a plurality of sub-tiles associated with a lower data layer of the plurality of data layers and generating pulse data corresponding to each of the plurality of sub-tiles of the lower data layer based on the pulse data associated with each of the plurality of tiles in a higher data layer of the plurality of data layers. The method also includes storing the pulse data associated with each of the plurality of tiles and each of the plurality of sub-tiles in each of the plurality of data layers in a plurality of buffers of a memory. The method further includes generating a radar image of the target region based on the pulse data corresponding to each of the plurality of sub-tiles associated with a lowest data layer of the plurality of data layers.

Another embodiment of the invention includes an SAR system. The system includes a radar transmitter configured to generate a plurality of radar transmission pulses and a radar receiver coupled to a radar aperture and configured to receive a plurality of reflected radar pulses corresponding to the plurality of radar transmission pulses having been reflected from a target region. The system also includes a processing controller configured to divide the target region into a plurality of tiles, to range-align a portion of the plurality of reflected radar pulses to an approximate center of a given one of the plurality of tiles, to filter out components of the range-aligned pulses corresponding to tiles other than the given tile, and to decimate the filtered range-aligned pulses to generate pulse data corresponding to the given one of the plurality of tiles in a highest data layer of a plurality of data layers. The processing controller is further configured to conduct a plurality of iterations, each corresponding to one of the plurality of data layers, of dividing each of the plurality of tiles into a plurality of sub-tiles corresponding to a lower data layer, to range-align the pulse data associated with each of the plurality of tiles in a higher data layer to an approximate center of a given sub-tile, to filter out components of the range-aligned pulse data corresponding to sub-tiles other than the given sub-tile, and to decimate the filtered pulse data to generate pulse data corresponding to the given sub-tile in the lower data layer. The system further includes a back projection image processor configured to generate a radar image of the target region based on the pulse data corresponding to each of the plurality of sub-tiles associated with a lowest data layer of the plurality of data layers.

DETAILED DESCRIPTION

The present invention relates generally to radar systems, and specifically to a synthetic aperture radar (SAR) imaging system. The SAR imaging system can be vehicle-based, such that an SAR transmitter and an SAR receiver can be located on a satellite or an aircraft. The radar transmitter can transmit radar transmission pulses, such as legacy linear frequency-modulated (FM) radar signals, to a target region to be imaged. A radar receiver that is coupled to a radar aperture can receive a plurality of reflected radar pulses corresponding to the plurality of radar transmission pulses having been reflected from a target region.

A tile processing controller can divide the target region into a plurality of tiles. The tile processing controller can include a range-aligner, a low-pass filter, and a decimator that can process the reflected radar pulses for each of the tiles, such that each of the tiles can have a set of pulse data corresponding to a processed portion of the reflected radar pulses in a highest data layer of a plurality of data layers. The tile processing controller can then iteratively divide each of the tiles into sub-tiles corresponding to one of a plurality of data layers, and can generate pulse data for each of the sub-tiles in a lower data layer based on the pulse data corresponding to the tile in a higher data layer. The iterative process can be repeated several times to generate pulse data for sub-tiles of sub-tiles, down to a lowest data layer. A back projection image processor can thus generate a radar image of the target region based on the pulse data of each of the sub-tiles in the lowest data layer.

It is to be understood that, as described and claimed herein, the terms "tile" and "sub-tile" are generally used interchangeably to refer to portions of the target region to be imaged with respect to the pulse data that is generated for the respective portions of the target region. A "sub-tile" may refer to a division of a "tile" in a next higher data layer, while that specific "tile" may be referred to as a "sub-tile" of yet another "tile" in an even next higher data layer. Thus, the term "tile" may refer to a portion of the target region in a higher data layer that may elsewhere be referred to as a "sub-tile". Similarly, the term "sub-tile" may refer to a portion of the target region in a lower data layer that may elsewhere be referred to as a "tile". Therefore, the terms "tile" and "sub-tile" are used to denote portions of the target region relative to each other. In addition, it is also to be understood that, as described and claimed herein, the data layers are referred to as "higher" and "highest" with respect to the larger and largest tiles of the target region, respectively, and that the data layers are referred to as "lower" and "lowest" with respect to the smaller and smallest sub-tiles of the target region, respectively, with the pulse data of the smallest sub-tiles in the lowest data layer being implemented for the SAR imaging.

Figure 1:
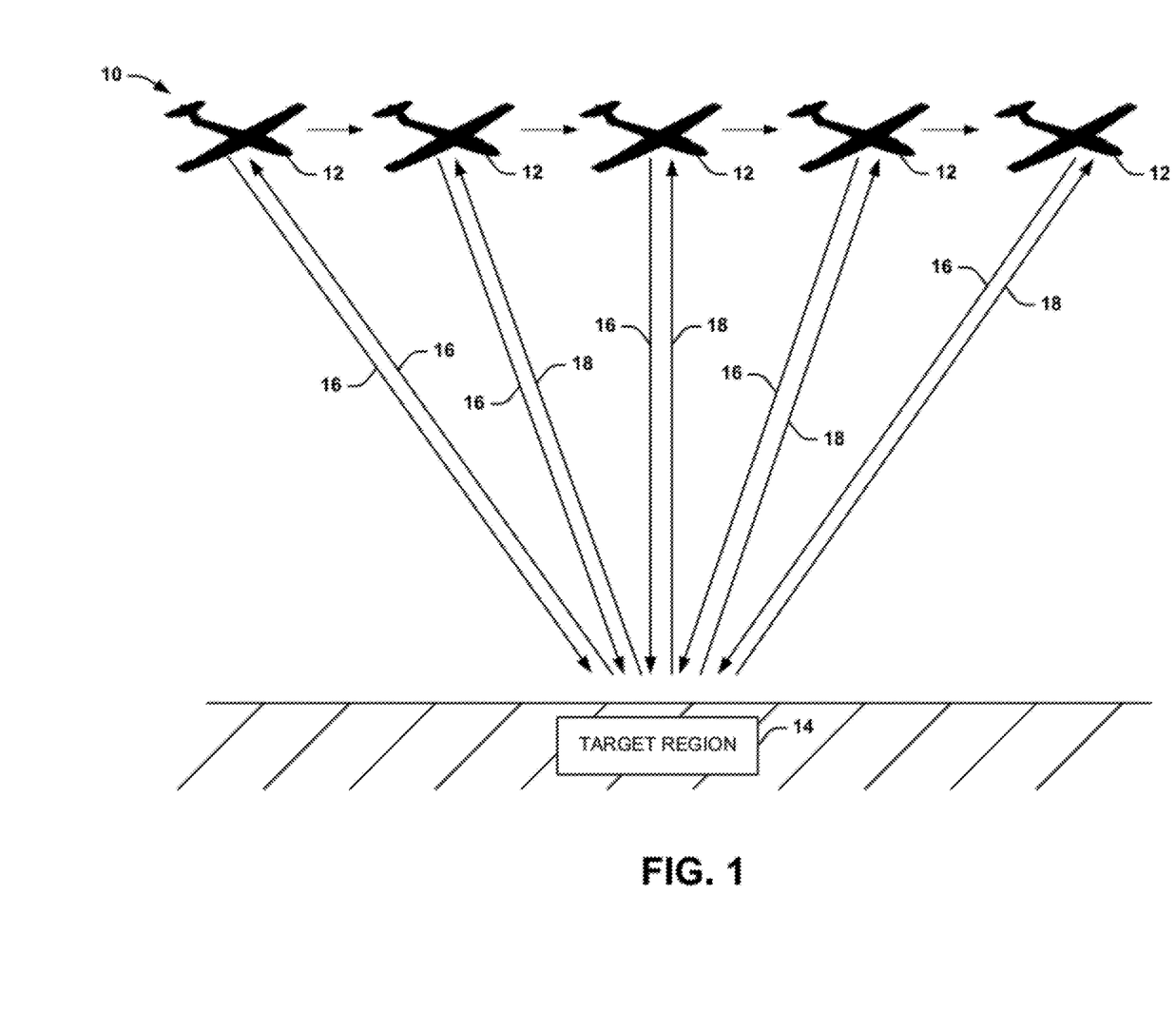
FIG. 1 illustrates an example of a synthetic aperture radar (SAR) imaging system in accordance with an aspect of the invention.

FIG. 1 illustrates an example of a synthetic aperture radar (SAR) imaging system 10 in accordance with an aspect of the invention. The SAR imaging system 10 includes an aircraft 12, demonstrated in the example of FIG. 1 as an airplane, flying past a target region 14 that is to be imaged. The target region 14 can include a variety of different landscapes.

The aircraft 12 can include an SAR system for imaging the target region. Specifically, the aircraft 12 can include an SAR transmitter that transmits radar transmission pulses 16 (e.g., linear frequency modulation (FM) chirps) to the target region and an SAR receiver that receives reflected radar pulses 18 corresponding to the radar transmission pulses 16 being reflected from the target region 14. The radar transmission pulses 16 can be continuously transmitted from the aircraft 12 as it flies over the target region, thus simulating a much greater radar aperture based on the changing azimuth of the aircraft 12 relative to the target region, and thus the changing angle of the radar transmission pulses 16 and the reflected radar pulses 18. It is to be understood that the radar transmission pulses 16 and the reflected radar pulses 18 are demonstrated simplistically, in that thousands of radar transmission pulses 16 (e.g., over 20,000) are transmitted and received as reflected radar pulses 18 as the aircraft 12 flies past the target region 14.

As an example, the SAR system on board the aircraft 12 can implement back projection to image the target region. Specifically, for each of the reflected radar pulses 18, the SAR system can calculate a range from the aperture of the SAR system to each pixel in the resultant image. The pulse return for the specific reflected radar pulse 18 can be interpolated at that range, and the radio frequency (RF) phase can be adjusted for that range. The data can then be summed into a resultant radar image. Back projection SAR imaging can be implemented for arbitrary flight paths of the aircraft 12, can project to digital terrain elevation data (DTED), and can typically yield the best and highest resolution images. However, back projection SAR imaging typically involves processing very large amounts of data, and thus image formation can be very slow, even with great processing capability.

Figure 2:
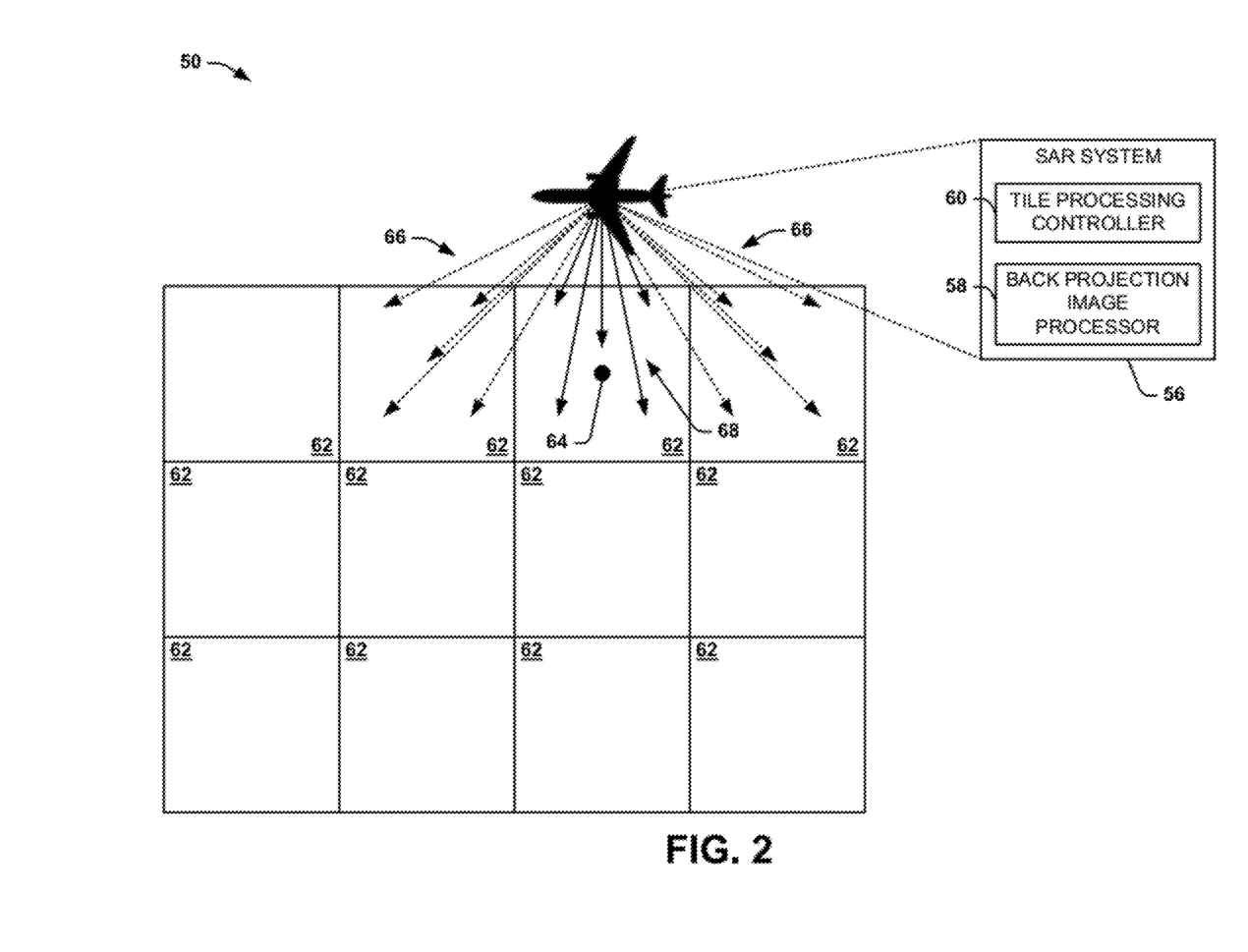
FIG. 2 illustrates another example of an SAR imaging system in accordance with an aspect of the invention.

FIG. 2 illustrates another example of an SAR imaging system 50 in accordance with an aspect of the invention. The SAR imaging system 50 includes an overhead view of an aircraft 52 flying over a target region 54. Similar to as described above in the example of FIG. 1, the aircraft 52 includes an SAR system 56 that emits radar transmission pulses and receives corresponding reflected radar pulses. The SAR system can include a back projection image processor 58, similar to as described above in the example of FIG. 1.

To significantly reduce the processing time of the generation of the radar image using back projection, the SAR system can include a tile processing controller 60 that is configured to divide the target region 54 into a plurality of tiles 62. In the example of FIG. 2, the tiles 62 are demonstrated as an array of sixteen square tiles corresponding to respective portions of the target region 54. The SAR system can thus process the reflected radar pulses to generate sets of pulse data corresponding specifically to each of the tiles 62. As an example, the tile processing controller 60 can range-align the reflected radar pulses to an approximate center point 64 of each of the tiles 62. The SAR system can then implement a low-pass filter (LPF) to filter out reflected radar pulse components (i.e., radar scatterers) having frequencies that are Doppler-shifted, such as effectively corresponding to other portions (i.e., other tiles 62) of the target region 54. This is demonstrated in the example of FIG. 2 by the dashed lines 66 corresponding to reflected radar pulse components that are being filtered-out. Thus, the reflected radar pulse components that are filtered out are essentially removed from the image data corresponding to the respective tile 62 being processed. The filtered reflected radar pulses, indicated in the example of FIG. 2 by the solid lines 68, are then decimated to reduce the corresponding pulse data for the respective tile 62, such as by removing every other filtered reflected radar pulse. Accordingly, the pulse data associated with each of the tiles 62 is a set of data specific to the radar imaging of that respective portion of the target region 54.

The pulse data that is generated for each of the tiles 62 corresponds to a broad data set for each of the respective portions of the target region 54. However, as described above, back projection image processing achieves high resolution based on range calculations for each pulse to each pixel of the resultant image. Thus, the tile processing controller 60 is further configured to divide each of the tiles 62 of the target region 54 into a plurality of sub-tiles. The tile processing controller 60 can thus generate a separate set of pulse data for each of the sub-tiles based on the set of pulse data that was generated for the tile 62 that was divided into the respective sub-tiles.

Figure 3:
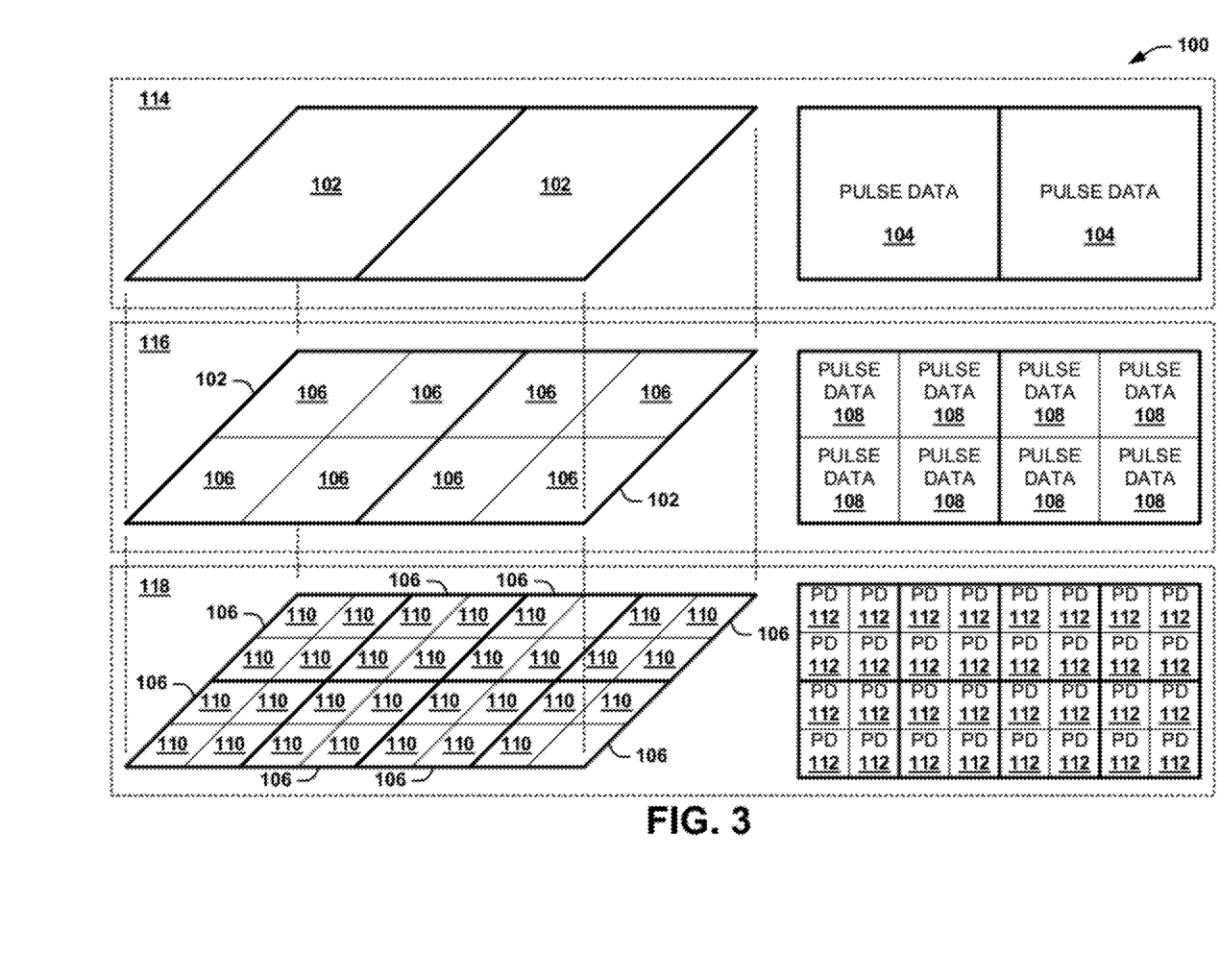
FIG. 3 illustrates an example of a tile data structure in accordance with an aspect of the invention.

FIG. 3 illustrates an example of a tile data structure 100 in accordance with an aspect of the invention. The tile data structure 100 can be implemented by the tile processing controller 60 in the example of FIG. 2. Therefore, reference is to be made to the example of FIG. 2 in the following description of the example of FIG. 3.

The tile data structure 100 demonstrates a pair of tiles 102 that can each correspond to one of the tiles 62 in the example of FIG. 2. Specifically, the pair of tiles 102 can each represent specific portions of the target region 54. The tile processing controller 60 generates a set of pulse data 104 associated with each of the respective tiles 102, such as by range aligning and range-reducing the reflected radar pulses to a center point of each of the respective tiles 102, filtering out components of the pulses, and decimating the filtered pulses. Thus, each of the sets of pulse data 104 corresponds to a broad set of image data associated with the respective portion of the target region 54 that is represented by the respective one of the tiles 102. Although the tiles 102 are demonstrated as approximately square, it is to be understood that the pulse data 104 may not be representative of a completely square-shaped portion of the target region 54, as demonstrated by the tiles 102, and that the pulse data 104 for each of the tiles 102 could overlap with respect to the portions of the target region 54.

The tile processing controller 60 is further configured to divide each of the tiles 102 into a plurality of sub-tiles 106. The tile processing controller 60 can then generate a set of pulse data 108 associated with each of the respective sub-tiles 106 based on the pulse data 104 associated with each of the tiles 102. Specifically, for each of the sub-tiles 106, the tile processing controller 60 range-aligns and range-reduces the pulse data 104 corresponding to the tile 102 from which the respective sub-tile 106 is divided to a center point of the respective sub-tile 106, filters out high-frequency components of the pulses of the pulse data 104, and decimates the filtered pulses of the pulse data 104 to generate the pulse data 108. Thus, each of the sets of pulse data 108 corresponds to a set of image data associated with the respective portion of the target region 54 that is represented by the respective one of the sub-tiles 106, and which is narrower than the broader set of image data represented by the pulse data 104 from which the pulse data 108 is generated.

In the example of FIG. 3, the tile processing controller 60 is yet further configured to divide each of the tiles 106 into a plurality of sub-tiles 110. The tile processing controller 60 can then generate a set of pulse data 112, demonstrated in the example of FIG. 3 as "PD", associated with each of the respective sub-tiles 110 based on the pulse data 108 associated with each of the tiles 106. Specifically, for each of the sub-tiles 110, the tile processing controller 60 range-aligns and range-reduces the pulse data 108 corresponding to the tile 106 from which the respective sub-tile 110 is divided to a center point of the respective sub-tile 110, filters out high-frequency components of the pulses of the pulse data 108, and decimates the filtered pulses of the pulse data 108 to generate the pulse data 112. Thus, each of the sets of pulse data 112 corresponds to a set of image data associated with the respective portion of the target region 54 that is represented by the respective one of the sub-tiles 110, and which is narrower than the broader set of image data represented by the pulse data 108 from which the pulse data 112 is generated.

Therefore, the example of FIG. 3 demonstrates that the tile processing controller 60 recursively generates pulse data in each of a plurality of data layers. Specifically, in the example of FIG. 3, the tiles 102 and corresponding sets of pulse data 104 are demonstrated as occupying a highest data layer 114, the tiles 106 and corresponding sets of pulse data 108 are demonstrated as occupying a lower data layer 116 relative to the highest data layer 116, and the tiles 110 and corresponding sets of pulse data 112 are demonstrated as occupying a lowest data layer 118. The tile processing controller 60 thus generates the pulse data in a recursive manner, such that the tile processing controller 60 implements pulse data from a next higher data layer corresponding to a given tile to generate pulse data for each of the sub-tiles associated with the given tile in a next lower data layer.

The tile processing controller 60 can continue to iteratively divide and sub-divide tiles and sub-tiles and generate sets of pulse data in lower data layers from pulse data in a next higher data layer. Specifically, in the example of FIG. 3, the tile processing controller 60 can further divide each of the tiles 110 into four sub-tiles, and can generate a set of pulse data for each of the four sub-tiles based on a corresponding set of pulse data 112. Accordingly, the tile processing controller 60 can iteratively continue to divide tiles into sub-tiles and generate pulse data in lower data layers from higher data layers until the tile processing controller 60 generates a set of pulse data for each of the sub-tiles in a lowest data layer. The back projection image processor 58 can thus generate the radar image from the sets of pulse data in the lowest data layer. As described in greater detail below, the generation of the resultant radar image can be significantly faster than typical back projection radar imaging based on the tiling and sub-tiling and recursive generation of pulse data described herein.

It is to be understood that the SAR imaging system 50 and the tile data structure 100 are not intended to be limited to the examples of FIGS. 2 and 3, respectively. As an example, the SAR system 56 is not limited to implementing back projection radar imaging, but could instead implement other types of SAR imaging, such as a polar format algorithm (PFA) or a range migration algorithm. As another example, the number of tiles in each of the data layers is not limited to that demonstrated in the examples of FIGS. 2 and 3. Specifically, in the example of FIG. 2, the highest data layer is not limited to the sixteen tiles 62, but could have more or less tiles 62. In addition, the tile processing controller 60 is not limited to dividing each tile into four sub-tiles, but could instead divide each tile into more or fewer sub-tiles with the corresponding filter and cutoff ratio. Therefore, the SAR imaging system 50 and the tile data structure 100 can be configured in a variety of ways.

Figure 4:
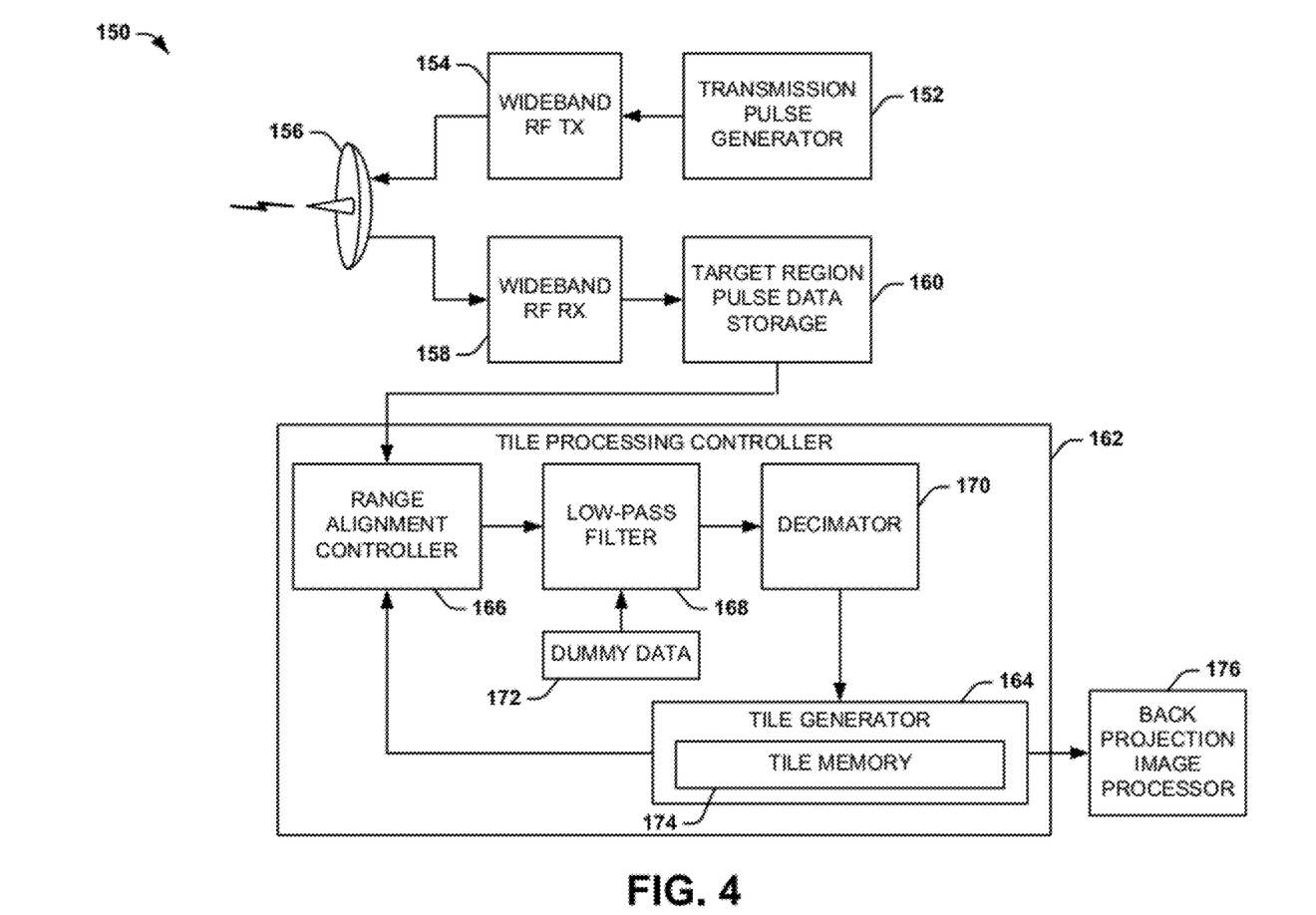
FIG. 4 illustrates an example of a schematic diagram of an SAR system in accordance with an aspect of the invention.

FIG. 4 illustrates an example of a schematic diagram of an SAR system 150 in accordance with an aspect of the invention. The SAR system 150 can correspond to the SAR system 56 in the example of FIG. 2. Therefore, reference is to be made to the examples of FIGS. 2 and 3 in the following description of the example of FIG. 4.

The SAR system 150 includes a transmission pulse generator 152 that is configured to generate radar transmission pulses, such as the radar transmission pulses 16 in the example of FIG. 1. As an example, the transmission pulse generator 152 can generate a baseband radar signal with a precisely controlled chirp rate, such that frequency can be monotonically increased or decreased along the length of the radar pulse, such as by linear FM techniques. The transmission pulses are provided to a wideband RF transmitter 154 that is configured to up-convert and/or modulate the radar transmission pulses for transmission. The radar transmission pulses are transmitted from an aperture 156 for transmission to the target region 54.

The aperture 156 collects the energy of the reflected radar pulses, such as the reflected radar pulses 18 in the example of FIG. 1. The reflected radar pulses are provided to a wideband RF receiver 158. The wideband RF receiver 158 can be configured to down-convert the received reflected radar pulses to an intermediate frequency (IF). The data associated with the reflected radar pulses of the target region 54 are stored in a target region pulse data storage 160. The target region pulse data storage 160 stores pulse data associated with substantially the entirety of the target region 54. Specifically, the pulse data can be associated with all of the reflected radar pulses that are processed by the SAR system 150 to generate a resultant radar image of the target region.

The SAR system 150 includes a tile processing controller 162. The tile processing controller 162 includes a tile generator 164, a range-alignment controller 166, a low-pass filter (LPF) 168, and a decimator 170. The tile generator 164 is configured to divide the target region 54 into the tiles 62, similar to as described above in the examples of FIG. 2. As an example, the tile generator 164 can designate approximate center points for the tiles 62 in the target region 54. The pulse data associated with the reflected radar pulses is provided from the target region pulse data storage 160 to the range-alignment controller 166. The range-alignment controller 166 thus range-aligns the reflected radar pulses to each of the approximate center points of each of the tiles 62 of the target region 54. The range-alignment controller 166 then shifts a phase associated with each of the reflected radar pulses to simulate an approximate zero Doppler-shift at the approximate center point of the tile 62.

In addition, the range-alignment controller 166 can range-reduce the range-aligned pulse data associated with reflected radar pulses to account for the range of the aircraft 52 to the associated tile 62. As an example, the range-alignment can be performed by the range-alignment controller 166 in the Fourier domain. Thus, the range-alignment controller 166 can likewise range-reduce the range-aligned pulse data associated with reflected radar pulses in the Fourier domain by filtering and decimating the range-aligned pulse data to be specific to the range to the associated tile 62. As another example, the range-reduction can be performed in the time domain, such that the range-alignment controller 166 can be configured to discard pulse data corresponding to return times that are outside of the range of the associated tile 62. As described herein, the range-reduction operation can be performed as part of the range-alignment operation of the range-alignment controller 166. However, it is to be understood that the range-reduction operation can be performed separately, such as by additional hardware.

The LPF 168 is configured to filter along the range-aligned and reduced reflected radar pulses to remove high-frequency components of the range-aligned pulses of the reflected radar pulse data that do not corresponding to the given tile 62. The LPF 168 thus has a pass-band corresponding only to the given tile 62. Specifically, radar scatterers that are Doppler-shifted, such as effectively corresponding to other tiles 62 of the target region 54, are removed by the LPF 168. As an example, the LPF 168 can be configured as a finite impulse response (FIR) filter having a plurality of taps, and can be implemented in a way that accounts for a group delay of the filter. The number of taps can be an odd number, for example, such that the group delay of the range-aligned pulses corresponds to an integer number of samples. As a result, it is not necessary for the tile processing controller 162 to interpolate the position of the aperture 156.

The LPF 168 can include a pass-band having a frequency range from approximately zero to a first percentage of the Nyquist frequency. As an example, the first percentage of the Nyquist frequency can be greater than one quarter, such as approximately 30%, to substantially account for higher order effects in filtering the pulse data. The LPF can also include a transition-band between the pass-band and a stop-band. For example, the transition-band can occupy a range from approximately 30% to approximately 70% of the Nyquist frequency. The stop-band can thus occupy approximately 70% of the Nyquist frequency to the Nyquist frequency. Thus, the LPF 168 implements approximately equal pass-band and stop-band weighting, with a substantially broader transition-band.

The wide transition-band of the LPF 168 can substantially mitigate deleterious edge-effects associated with the filtering of the pulse data. Specifically, these deleterious edge-effects can be completely removed by zero-padding the beginning and end of the data provided to the LPF 168. Zero-padding along azimuth is accomplished by adding fictitious zero-filled pulses at the beginning and the end of the data. These fictitious pulses can have an associated antenna location; for this purpose it is sufficient to smoothly extrapolate the antenna path. The output of the LPF 168 can contain non-zero pulses outside of the physical aperture, but this can be an artifact of chopping the data, thus introducing sidelobes, and not an artifact of the filter itself. The zero-padding can thus allow the recursively tiled back projection image processing methodology described herein to produce a substantially similar output image as a traditional back projection image processor, but in a much more rapid manner.

The use of a wide transition band of the LPF 168 requires that the signal be oversampled for each individual top level tile. The initial oversampling can result from breaking the entirety of the image into a 4×4 array of top layer tiles so that each top layer tile contains Doppler frequencies less than one quarter of the Nyquist frequency after alignment. At each successive tiling stage, a given tile can be divided into 2×2 array of sub-tiles, each of the sub-tiles including approximately half the Doppler bandwidth and approximately half the range extent, such that after filtering and decimation a Doppler bandwidth of approximately 25% of Nyquist throughout is maintained through the tiling sequence. Other tiling strategies can be similarly implemented. For example, a 3×3 array of sub-tiles can be generated for each tile, with each sub-tile including a Doppler bandwidth approximately one third of Nyquist, thus allowing a LPF stage with a pass-band from zero to 0.33 Nyquist and a stop-band from 0.66 to Nyquist without initial oversampling. If the entirety of the image is significantly oversampled (e.g., has a Doppler bandwidth substantially below Nyquist), then the tiling sequence could use a smaller number of larger top layer tiles or the data could be filtered and decimated to reduce the degree of oversampling.

The decimator 170 is configured to remove a fraction of the filtered range-aligned pulse data. As an example, the decimator 170 can remove every other range-aligned pulse of the filtered pulse data that is output from the LPF 168. As a result, the decimator 170 effectively reduces the size of the pulse data corresponding to the given tile 62 to a more processing manageable quantity while maintaining resultant image quality. The decimator 170 thus outputs the pulse data corresponding to the given tile, such as pulse data 104 in the example of FIG. 3. The resultant pulse data for the tile 62 is saved within a buffer in a tile memory 174 in the tile generator 164.

The tile processing controller 162 thus generates the pulse data for each of the tiles 62 in the highest data layer 114 via the range-alignment controller 166, the LPF 168, and the decimator 170 and stores the pulse data corresponding to each of the tiles 62 in separate buffers of the tile memory 174. The tile generator 164 then divides each of the tiles 62 into sub-tiles, such as the sub-tiles 106 from the tiles 102 in the example of FIG. 3. For each of the sub-tiles, tile generator 174 then provides the pulse data associated with the respective tile 62 from which the sub-tiles were divided to the range-alignment controller 166. The tile processing controller 162 thus recursively generates a set of pulse-data for each of the sub-tiles in the next lower data layer based on the pulse data of the tile in the next higher data layer from which the sub-tile was divided. The tile processing controller 162 can continue to divide tiles into sub-tiles and recursively generate respective sets of pulse data over a number of iterations (e.g., six or more). As an example, the tile processing controller 162 can perform a number of tiling and pulse data generating iterations to divide the target region 54 having over 20,000 associated reflected radar pulses down to an array of 256×256 sub-tiles. Each of the sub-tiles can have approximately 64×64 pixels in the resultant image, for a total of approximately 16 k×16 k pixels in the resultant image, based on approximately 200 processed reflected radar pulses in the corresponding pulse data.

Figure 5:
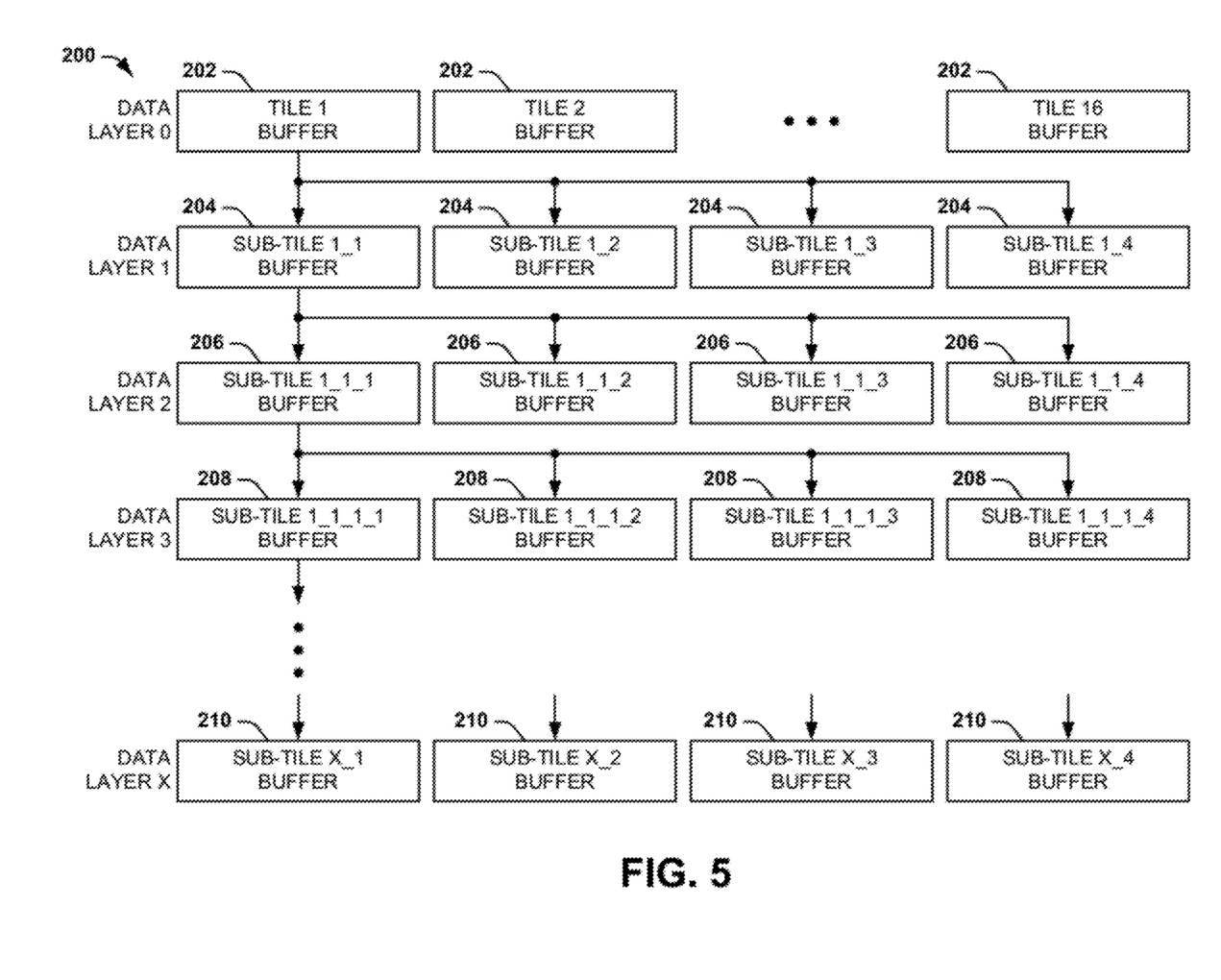
FIG. 5 illustrates an example of a tile memory system in accordance with an aspect of the invention.

FIG. 5 illustrates an example of a tile memory system 200 in accordance with an aspect of the invention. The tile memory system 200 can correspond to the tile memory system 174 in the example of FIG. 4. Thus, reference is to be made to the example of FIG. 4 in the following description of the example of FIG. 5.

In the example of FIG. 5, the tile memory system 200 includes a plurality of memory buffers 202 in a highest data layer, designated DATA LAYER 0. The plurality of memory buffers 202 are each configured to store pulse data associated with a specific one of the tiles 52 in the example of FIG. 2. Specifically, as demonstrated in the example of FIG. 5, the memory system 200 includes sixteen of the memory buffers 202, corresponding respectively to TILE 1 through TILE 16. Thus, the tile processing controller 162 can store the generated pulse data for each of the tiles 62 in the respective one of the memory buffers 202. As an example, the pulse data can correspond to data associated with a portion of the reflected radar pulses and/or other radar imaging data, such as phase history associated with the portion of the reflected radar pulses and an array of data associated with location of the aperture 156.

The tile generator 164 can then divide each of the tiles 62 into a set of four sub-tiles. The memory system 200 includes a plurality of memory buffers 204 associated with a next lower data layer from DATA LAYER 0, demonstrated in the example of FIG. 5 as DATA LAYER 1. Specifically, the memory system 200 includes a set of four memory buffers 204 structured beneath each of the memory buffers 202 for a total of 64 of the memory buffers 204. Thus, the memory buffers 204 are designated for SUB-TILE 1_1 through SUB-TILE 1_4, such that the sub-tiles 204 associated with TILE 16 would be designated for SUB-TILE 16_1 through SUB-TILE 16_4. Therefore, based on this structure pattern, the tile memory system 200 further includes a plurality of memory buffers 206 associated with a next lower data layer, DATA LAYER 2, a plurality of memory buffers 208 associated with a next lower data layer, DATA LAYER 3, and down a number of layers to a plurality of memory buffers 210 associated with a lowest data layer, DATA LAYER X, where X is an integer greater than 1. The memory buffers 210 are demonstrated as *_1 through *_4, where "*" denotes the tiles and sub-tiles from which the respective set of memory buffers 210 are structured. For example, for X=6, "*" can represent the memory buffer 1_1_1_1_1_1_1 in the next higher data layer, DATA LAYER 5, beneath which the memory buffers 210 are structured based on each of the memory buffers demonstrated in the example of FIG. 5 being structured from the first, or "1", memory buffer in each of the data layers.

Each of the memory buffers 204, 206, 208, and 210 stores pulse data that is generated by the tile processing controller based on the pulse data that is stored in the respective memory buffer in the next highest data layer beneath which it is structured. Specifically, the tile generator 164 accesses the pulse data from a respective one of the memory buffers in a given data layer for the tile processing controller 162 to generate sets of pulse data for the respective sub-tiles in the next lower data layer. Thus, the tile generator 164 thus stores the newly generated sets of pulse data into the respective memory buffers structured beneath the accessed memory buffer in the next lower data layer within the tile memory system 200. The memory buffers 210 thus store the pulse data associated with the smallest sub-tiles in the tiling process conducted by the tile generator 164.

The memory buffers 202 through 210 of the tile memory system 200 can be very large to accommodate the large amounts of data that can represent a given set of pulse data for a given tile. Particularly, the memory buffers 202 can have the largest data capacity to accommodate the large amounts of pulse data associated with such a larger portion of the target region, with the memory buffers being increasingly smaller from one lower data layer to the next. However, the large amounts of pulse data can cause a memory buffer in a given one of the data layers to overflow. Thus, upon a given memory buffer corresponding to a respective tile in a data layer being full, the tile processing controller 162 can generate partial sets of pulse data for the respective sub-tiles in the next lower data layer at a given time. For example, if a given memory buffer 202 in the DATA LAYER 0 overflows, the tile processing controller 162 can begin generating sets of pulse data for the respective sub-tiles in DATA LAYER 1, and thus storing the partial sets of pulse data in the respective memory buffers 204. The pulse data in the given memory buffer 202 can then be overwritten by additional and/or the rest of the pulse data for the given tile in DATA LAYER 0, after which the tile processing controller 162 can finish generating the sets of pulse data for the respective sub-tiles in DATA LAYER 1, which is thus stored in the memory buffers 204.

It is to be understood that the tile memory system 200 is not limited to the example of FIG. 5. Specifically, the structure of the memory buffers 202 through 210 are demonstrated in the example of FIG. 5 as diagrammatically corresponding to the manner in which pulse data is generated for each of the sub-tiles that are divided from a respective tile in a next higher data layer. Thus, the memory buffers 202 through 210 can be configured in any of a variety of data structures within the tile memory system 200.

Referring back to the example of FIG. 4, the SAR system 150 further includes a back projection image processor 176. The back projection image processor 176 is configured to access each of the memory buffers corresponding to the lowest data layer from the tile memory 174, such as the memory buffers 210 in the example of FIG. 5, to generate a radar image of the target region. Specifically, for each pulse of the pulse data corresponding to each of the sub-tiles in the lowest data layer, the back projection image processor 176 can calculate a range from the aperture 156 to each pixel in the given sub-tile. The pulse return for each specific pulse can be interpolated at that range, and the RF phase can be adjusted for that range. The resultant pulse data can then be summed into a resultant radar image. However, based on the iterative tiling and sub-tiling and the recursive generation of the pulse data based on pulse data of the tiles in the next higher data layer, the back projection image processor 176 can generate the resultant radar image very rapidly relative to typical back projection image processing.

By dividing the target region into the plurality of sub-tiles down to the lowest data layer, the back projection image processor 176 processes a greatly reduced number of pulses relative to typical back projection image processing. Specifically, in back projection image processing, the number of pulses that are implemented for image processing is proportional to the imaging area, such that the amount of processing for generating an image of a given area, such as a tile 62, is proportional to $N*X*Y$, where N is a number of pulses and X and Y are the width and length of the resultant radar image in pixels. Thus, upon dividing a given tile into four sub-tiles, each approximately a quarter the size of the parent tile, the image associated with each of the sub-tiles is represented by $(X/2)\times(Y/2)$ pixels. Upon generating the pulse data for a given sub-tile based on the pulse data of the parent tile, the number of associated pulses in the pulse data for the sub-tile can be approximately half the number of pulses in the pulse data for the parent tile, thus approximately (N/2) pulses. Therefore, if the amount of processing for generating the image of a given tile is $N*X*Y$, then the amount of processing for generating the image of a the four sub-tiles corresponding to the given tile is $4*(N/2)*(X/2)*(Y/2)$, which simplifies to $(N*X*Y)/2$, minus the processing overhead required for dividing the sub-tiles and recursively generating the associated sets of pulse data. Therefore, the back projection image processing, as described herein, is approximately twice as fast for each data layer of the iterative tiling process, minus the processing overhead at each data layer, relative to a typical back projection imaging process. As a result, an image that would typically require ten or more hours to generate on a given computer could be generated in less than approximately three minutes based on the iterative tiling and recursive pulse data generation technique described herein.

Referring again to the example of FIG. 5, the recursive tile generation of pulse data by the tile processing controller 162 and the storing of the pulse data in the memory buffers 202 through 210 can result in the memory buffers 202 through 210 overflowing in a cascade fashion. Specifically, the memory buffers in a lower data layer can thus overflow in response to an overflow of the respective memory buffer in the data layer above, such that the memory buffers in the lowest data layer can likewise overflow. Therefore, upon the memory buffer in the lowest data layer overflowing, the back projection image processor 176 can be configured to begin generating the radar image of the target region based on the pulse data in the memory buffers in the lowest data layer. The pulse data in the memory buffers in the lowest data layer can then be overwritten by additional and/or remaining pulse data that is generated for the sub-tiles in the lowest data layer. Accordingly, similar the tile processing controller 162 generating partial sets of pulse data from pulse data in overflowing memory buffers, the back projection image processor 176 can generate the radar image of the target region in a piece-meal fashion in response to an overflow of the memory buffers in the lowest data layer.

The generation of the pulse data down to a lowest data layer, such that each of the sub-tiles in the lowest data layer has a number of pulses in an associated set of pulse data that is specific to that respective sub-tile, allows for the implementation of additional efficient radar imaging techniques.

As one example, in a given collection period, the transmission pulse generator 152 can be configured to generate more than a sufficient number of radar transmission pulses to generate a given radar image. For example, whereas approximately 20,000 radar transmission pulses may be sufficient to generate a quality radar image of sufficient resolution, the transmission pulse generator 152 can be configured to generate approximately 40,000 or more radar transmission pulses. Thus, upon processing the reflected radar pulses and recursively generating the pulse data down to the sub-tiles of the lowest data layer, the pulse data associated with the sub-tiles of the lowest data layer could include a number of pulses that is greater than that which is necessary for the back projection image processor 176 to process the radar image (e.g., approximately 400 pulses instead of approximately 200 pulses). Therefore, the back projection image processor 176 can be configured to generate a plurality of separate radar images of the target region 54 based on a respective plurality of unique subsets of the pulse data of each of the sub-tiles of the lowest data layer. Because the separate radar images are based on unique subsets of the pulse data of the sub-tiles of the lowest data layer, each of the separate radar images can be distinct images. The separate radar images can include an overlap in the pulse data in each of the unique subsets of the pulse data, such that the back projection image processor 176 can implement aperture weighting to simulate overlapped apertures. Thus, the back projection image processor can generate the separate radar images while maintaining side-lobe control and further avoiding edge effects.

As another example of efficient radar imaging techniques, the tile processing controller 162 can simulate spatially variant apertures based on the recursive generation and processing of the pulse data associated with separate portions of the target region 54. Specifically, in processing the reflected radar pulses at the highest data layer, the tile processing controller 162 can be configured to increase a number of pulses corresponding to the pulse data for portions of the target region 54 that are further away from the radar aperture 156 relative to portions of the target region 54 that are closer to the radar aperture 156. For example, the tile processing controller 162 can adjust the filtering and/or decimation characteristics of the LPF 168 and/or the decimator 170, respectively, for each of the data layers from the highest data layer down to the lowest data layer. As a result, the back projection image processor 176 can generate the radar image in such a manner as to simulate a constant azimuth resolution across the radar image. Specifically, because the range and angular characteristics of the radar aperture 156 are applied at the level of the sub-tiles of the lowest data layer, the tile processing controller 162 can adjust the range and angular characteristics of the radar aperture 156 at the level of the sub-tiles of the lowest data layer.

Another example implementation of more efficient radar imaging techniques based on the tile generation procedures and recursive pulse data generation described herein is a more efficient range calculation. As described above, back projection radar imaging implements a calculation of the range from the aperture 156 to each pixel in the resultant radar image. The calculation of the range is a vector calculation in three-dimensional space, such that for a given aperture location $<X_A, Y_A, Z_A>$, and a given pixel location $<X_P, Y_P, Z_P>$, the range can be calculated as follows:

$$R=\sqrt{(X_A-X_P)^2+(Y_A-Y_P)^2+(Z_A-Z_P)^2}$$  Equation 1

The operation demonstrated by Equation 1 requires five additions, three multiplications, and a square-root for every pixel for each of the reflected radar pulses. The square-root operation alone can be very processing intensive. In addition, due to the extreme range of the radar aperture 156 relative to each of the pixels, the range calculation is typically performed at double precision (e.g., 8 bytes resolution instead of 4 bytes). Therefore, performing the range calculation using Equation 1 for every pixel for each of the reflected radar pulses can require a large amount of processing time.

Figure 6:
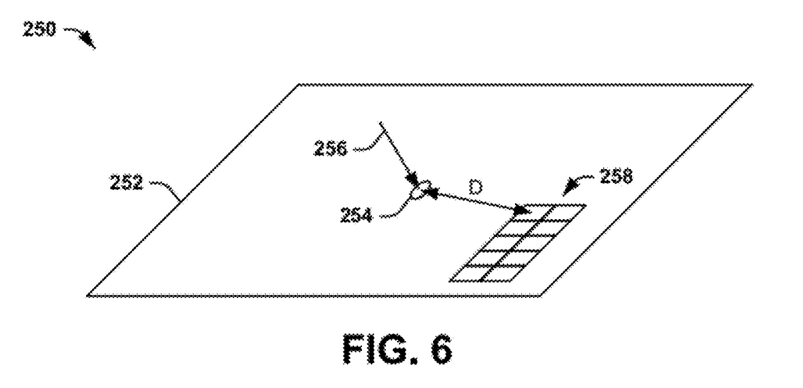
FIG. 6 illustrates an example of a back-projection SAR distance calculation system in accordance with an aspect of the invention.

FIG. 6 illustrates an example of a back-projection SAR distance calculation system 250 in accordance with an aspect of the invention. The SAR distance calculation system 250 can be implemented by the back projection image processor 174 to provide for an even more efficient manner of generating the radar image. Thus, reference is to be made to the example of FIG. 4 in the following description of the example of FIG. 6.

The example of FIG. 6 demonstrates a sub-tile 252 corresponding to a given sub-tile associated with the lowest data layer, such that the pulse data associated with the sub-tile 252 is implemented by the back projection image processor 174 to generate the resultant radar image. For each of the range-aligned pulses of the pulse data associated with a given sub-tile, the back projection image processor 174 can implement a normal double-precision calculation to get Rc, the range from the aperture 156 to an approximate center point 254 of the sub-tile 252 using Equation 1. However, the back projection image processor 174 can then implement a low-order approximation to calculate dR, the difference between the range from the aperture 156 to a given pixel and Rc. The low-order approximation can thus be a single precision calculation based on the magnitude of D, the vector from the from the approximate center point 254 of the sub tile 252 to the individual pixel, being significantly less than the range Rc from the aperture 156 to the approximate center point 254. Thus, the low-order approximation results in more rapid processing based on the series of single precision calculations, as opposed to double precision calculations.

A normalized look vector 256 (i.e., the vector from the center of the aperture 156 to the approximate center point 258 of the sub-tile 252) of a given pulse of the pulse data corresponding to the sub-tile 252 is defined as $L_N$. A dot product between the normalized look vector and D is defined as dL, as follows:

$$dL=L_N \cdot \text{dot} \cdot D$$  Equation 2

Where: D is a vector from the approximate center point 254 to the given pixel 258.

A first order approximation for the range from the aperture to the pixel can be expressed as:

$1^{st}$ Order Approximation:

$$R \approx Rc+dL$$  Equation 3

A second order correction factor $d\rho^2$ can then be calculated based on the vector from the approximate center point 254 to the pixel D and dL as follows:

$$d\rho^2=|D|^2-dL^2$$  Equation 4

The second order correction factor $d\rho^2$ can thus be used in a second or third order approximation to remove the square-root component of the range calculation R to the given pixel 258, as follows:

$2^{nd}$ Order Approximation:

$$R=Rc+dL+0.5*d\rho^2/Rc$$  Equation 5

$3^{rd}$ Order Approximation:

$$R=R_C+dL+0.5*(1-dL/Rc)*(1+dL^2/Rc^2)*d\rho^2/Rc$$  Equation 6

The first, second, or third-order approximation of the range to each of the pixels 258 in a given sub-tile 252 for every pulse of the pulse data corresponding to the given sub-tile 252 is thus significantly faster based on Equations 2 through 6 than the calculation based on Equation 1. Specifically, the low-order approximations based on Equations 2 through 6 omit the use of a square-root, and are thus computationally faster in the back projection image processor 174. Furthermore, because the range is calculated from the approximate center point 254 to each pixel 258 in a relatively small sub-tile 252, double precision calculations are not necessary to achieve sufficient precision. Therefore, the calculations of Equations 2 through 6 can all be performed in single precision, thus further increasing the computational speed of the range calculation to each pixel 258 in the sub-tile 252. The use of a low order approximation to the range is made possible due to the small size of the sub-tile relative to the range to the sub-tile. The selection of the first, second, or third order approximation can be based on the size of the sub-tile relative to the range and the degree of precision required. In practice, these approximations could be used by first range aligning the pulse data corresponding to the lowest level sub-tile to the approximate center of the sub-tile, then performing the back-projection interpolation and phase correction based only on the difference between the range to the individual pixel and Rc, the range to the approximate center of the sub-tile.

It is to be understood that the above computations of the approximate range can accommodate back projection to digital terrain elevation data (DTED). The vector D from the approximate center of the sub-tile would simply include height component of each pixel due to the DTED, and the approximate tile centers used at each stage of tiling likewise include the height due to DTED.

Figure 7:
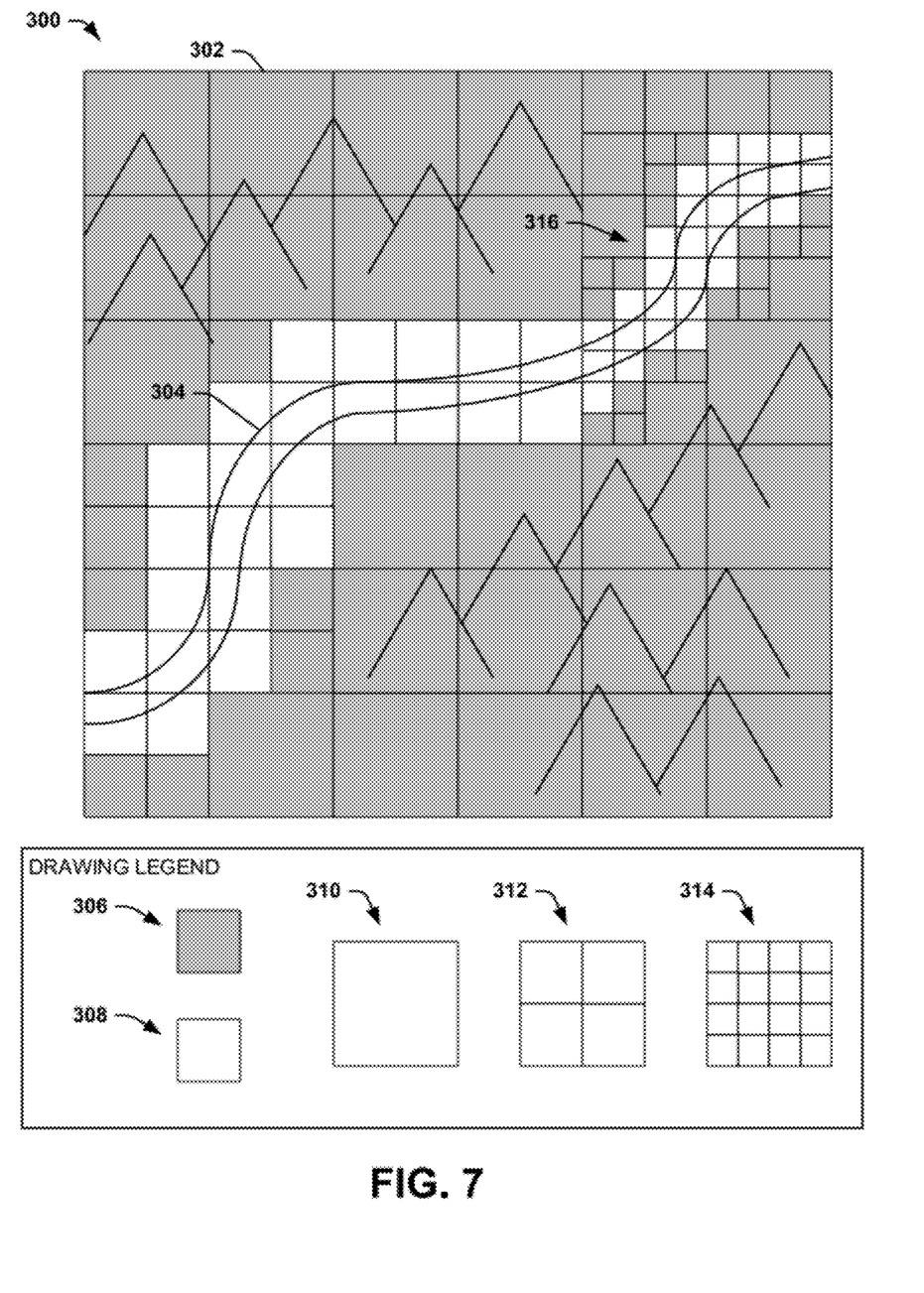
FIG. 7 illustrates an example of an image masking system in accordance with an aspect of the invention.

Another implementation of additional efficient radar imaging techniques is demonstrated in the example of FIG. 7. FIG. 7 illustrates an example of an image masking system 300 in accordance with an aspect of the invention. The image masking system 300 can be implemented in the SAR system 150 in the example of FIG. 4. Therefore, reference is to be made to the example of FIG. 4 in the following description of the example of FIG. 7.

The image masking system 300 is demonstrated as an overhead view of a target region 302 to be imaged. The target region 302 includes a river 304 that flows through the target region 302. In the example of FIG. 7, it may be necessary for the SAR system 150 to only image a portion of the target region 302 that includes the river 304. Thus, it may not be important for the SAR system 150 to image the remaining portion of the target region 302. Therefore, based on the tiling methodology and the recursive pulse data generation for the given data layers described herein, the portion of the target region 302 that includes the river 304 can be very quickly and efficiently imaged by the SAR system 150.

In the example of FIG. 7, the tile processing controller 162 can be configured to check a distance for a given tile in a given data layer from the given region to be imaged. As an example, the portion of the target region 302 can be designated based on a predetermined distance from the banks of the river 304. Thus, the tile processing controller 162 can check to determine if a given tile in a given data layer is within the predetermined distance. If the given tile is not within the predetermined distance, the tile is masked from the resultant radar image, and is thus excluded from further processing. Therefore, the tile generator 164 does not generate a set of sub-tiles based on the given tile, and a set of pulse data is not generated for the given tile. Tiles that are masked from the radar image are demonstrated in the example of FIG. 7 as shaded tiles corresponding to a masked region 306, while those that are to be included in the radar image are demonstrated in the example of FIG. 7 as a non-shaded region 308.

The determination of whether a given tile is within the predetermined distance can be performed at any of the data layers, and can be programmable and/or variable. Specifically, the example of FIG. 7 demonstrates tiles in a first data layer 310, tiles in a second data layer 312, and tiles in a third data layer 314. The tiles in the third data layer 314 occupying a next lower data layer of the tiles in the second data layer 312, which occupy a next lower data layer of the tiles in the first data layer 310. The tile processing controller 162, upon dividing the target region 302 into the tiles of the first data layer 310, can then determine if any portion of the tiles of the first data layer 310 are within the predetermined distance of the river 304. If no portion of a given one of the tiles in the first data layer 310 is within the predetermined distance, then the tile processing controller 162 can mask the given one of the tiles in the first data layer 310, thus further excluding the given tile from further processing. Those tiles of the first data layer 310 that are within the predetermined distance of the river 304 are processed further, such that the tile processing controller 162 generates a set of pulse data for those tiles of the first data layer 310 based on the pulse data of a tile in the next higher data layer or from the reflected radar pulses if the tiles in the first data layer 310 occupy the highest data layer.

Upon processing the pulse data of the tiles of the first data layer 310 that are within the predetermined distance of the river 304, the tile processing controller 162 can divide those tiles into respective sub-tiles that occupy the second data layer 312. The tile processing controller 162 can then check to determine if the respective sub-tiles in the second data layer 312 are within the predetermined distance 304, and thus exclude the sub-tiles in the second data layer 312 that are outside of the predetermined distance 304 without generating pulse data for them. Thus, the masking of the tiles/sub-tiles can be performed at any data layer, including the sub-tiles of the lowest data layer. Specifically, in the example of FIG. 7, a particular area of the river 304 is designated at 316 in which the tile processing controller 162 provides the selective tile masking at the third data layer 314, as opposed to the higher data layers of the first and second data layers 310 and 312. As an example, the tile processing controller 162 can perform the selective tile masking demonstrated in the example of FIG. 7 at higher data layers to provide a larger area of imaging of the selected portion of the target region 302.

Thus, the example of FIG. 7 demonstrates a significantly more efficient radar imaging technique. Specifically, the image masking system 300 in the example of FIG. 7 substantially minimizes unnecessary processing by masking-out the portions of the target region 302 that are unnecessary for image formation. The small size of the sub-tiles at the lowest data layer can thus also substantially reduce the pixilation of the target region 302. Furthermore, the image masking system 300 in the example of FIG. 7 is particularly well adapted to circle-mode collection of the reflected radar pulses with respect to the image formation.

Figure 8:
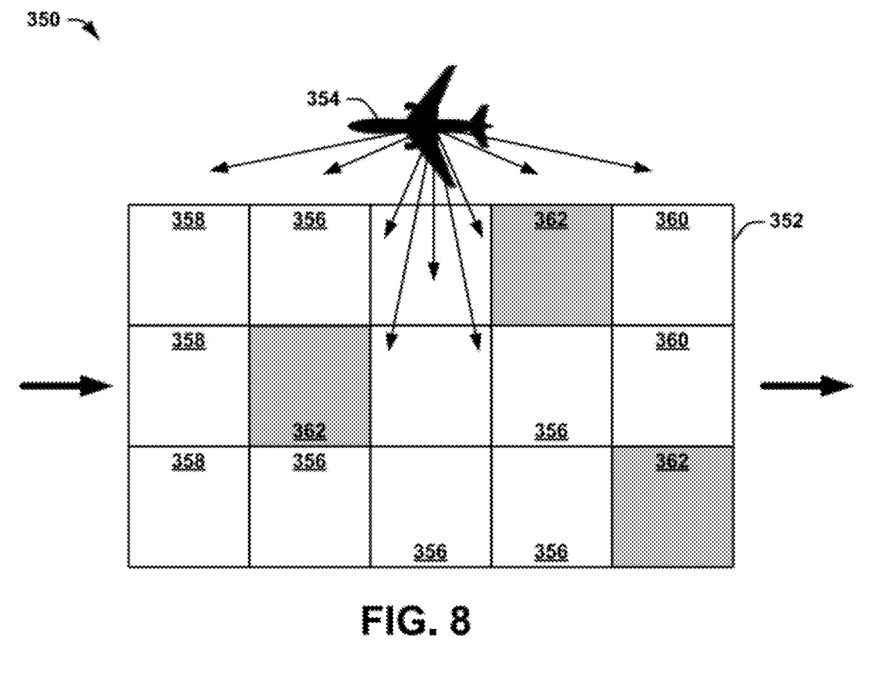
FIG. 8 illustrates an example of an SAR strip imaging system in accordance with an aspect of the invention.

Yet another implementation of additional efficient radar imaging techniques is demonstrated in the example of FIG. 8. FIG. 8 illustrates an example of an SAR strip imaging system 350 in accordance with an aspect of the invention. The strip imaging system 350 can be implemented in the SAR system 150 in the example of FIG. 4. Therefore, reference is to be made to the example of FIG. 4 in the following description of the example of FIG. 8.

The strip imaging system 350 includes a target region 352 to be imaged as an aircraft 354 flies overhead. In the example of FIG. 8, the aircraft 354 flies from right to left, and thus the target region 352 moves from left to right relative to the aircraft 354. Thus, as the aircraft 354 flies over the target region 352, the transmission pulse generator 152 can continuously generate the radar transmission pulses that are emitted from the radar aperture 156. Thus, the tile processing controller 162 can divide the target region 352 into tiles 356, which are further divided into sub-tiles for which pulse data is recursively generated, as described herein. Therefore, the back projection image processor 176 can be configured to generate a continuous strip radar image. Specifically, as the aircraft 354 moves to within a threshold distance of a new portion of the target region 352, the tile processing controller 162 can generate a new set of tiles 358 with a corresponding set of pulse data. The recursive generation of pulse data for corresponding sub-tiles of the new tiles 358 can be performed by the tile processing controller 162 in parallel with the generation of further new sets of tiles toward which the aircraft 352 approaches.

To handle the large amounts of pulse data that can be required for generating the strip radar image, as the aircraft 354 moves beyond a threshold distance of already processed tiles 360, the tile processing controller 162 can discard the pulse data associated with the already processed tiles 360. As a result, the buffers of the tile memory 174 from which pulse data is discarded can be reused for pulse data associated with the new tiles 358. The back projection image processor 176 can thus continue to store image data associated with the strip radar image as the strip radar image is being generated, thus ensuring that no portions of the strip radar image data are lost. In addition, in the example of FIG. 8, the strip imaging system 350 can be configured to mask portions of the target region 352, similar to as described above in the example of FIG. 7. Specifically, in the example of FIG. 8, as the aircraft 354 flies over portions of the target region 352, certain tiles 362 can be selectively masked, such that pulse data is not generated for the selected tiles 362. Accordingly, the strip imaging system 350 can generate the strip radar image of only the desired portions of the target region 352 as the aircraft 354 flies overhead.

Figure 9:
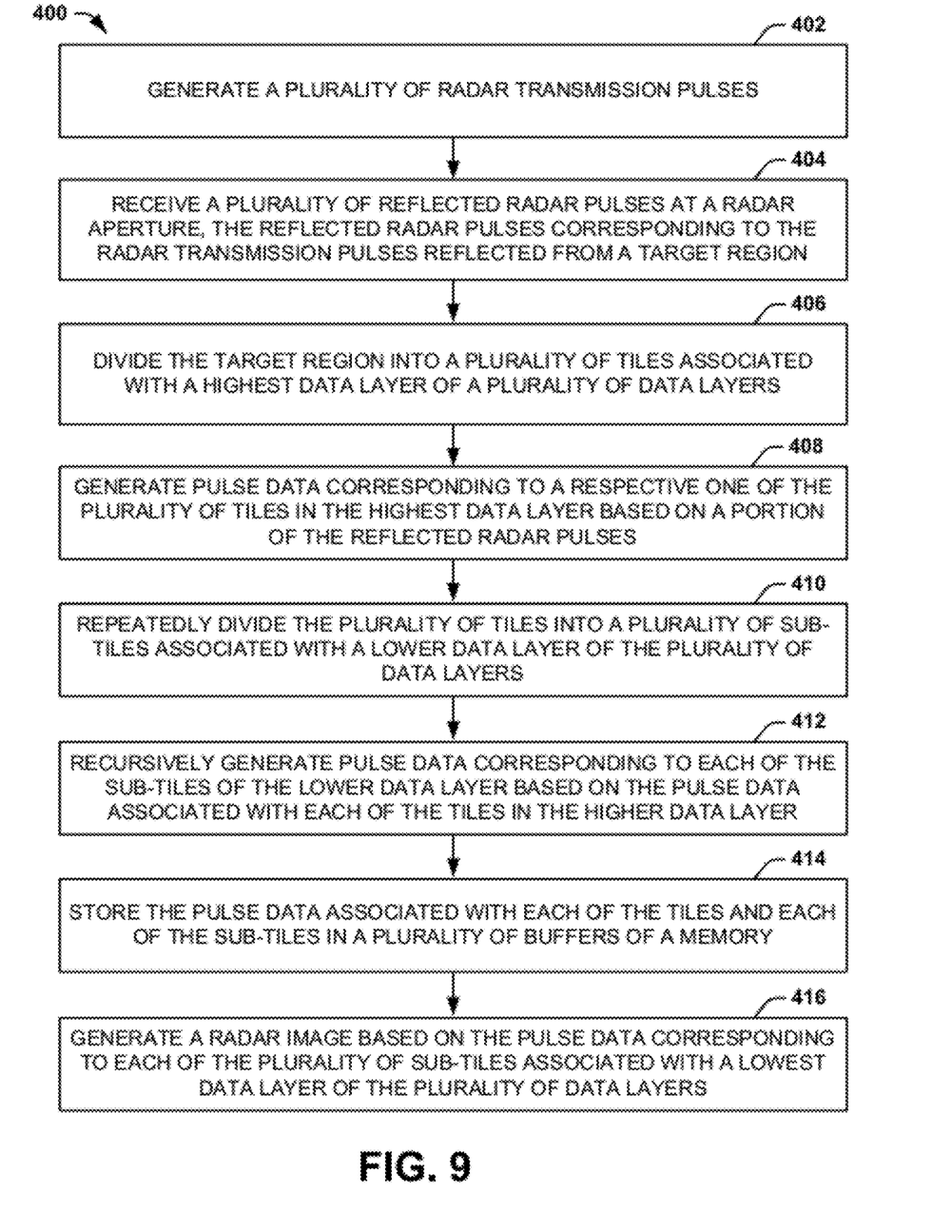
FIG. 9 illustrates an example of a method for SAR imaging in accordance with an aspect of the invention.

In view of the foregoing structural and functional features described above, a methodology in accordance with various aspects of the present invention will be better appreciated with reference to FIG. 9. While, for purposes of simplicity of explanation, the methodology of FIG. 9 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 9 illustrates an example of a method 400 for method for synthetic aperture radar (SAR) imaging. At 402, a plurality of radar transmission pulses are generated. The radar transmission pulses can be generated by a transmission pulse generator and can be emitted by a radar aperture. At 404, receiving a plurality of reflected radar pulses are received at a radar aperture, the plurality of reflected radar pulses corresponding to the plurality of radar transmission pulses having been reflected from a target region. The target region can be any of a variety of geographic areas, and can be a dynamic area, such that the resultant radar image is a strip radar image.

At 406, the target region is divided into a plurality of tiles associated with a highest data layer of a plurality of data layers. The division of the target region into tiles can be performed by a tile generator within a tile processing controller, with each of the tiles having an associated approximate center point. At 408, pulse data corresponding to a respective one of the plurality of tiles in the highest data layer is generated based on a portion of the plurality of reflected radar pulses. The tile processing controller can generate the pulse data as a set of the reflected radar pulses that are range-aligned to the approximate center point of the respective tile, low-pass filtered, then decimated to generate a set of processed pulses that are specific to the respective tile. At 410, each of the plurality of tiles is repeated divided into a plurality of sub-tiles associated with a lower data layer of the plurality of data layers. The tile processing controller can iteratively divide each tile into a set of sub-tiles, and each sub-tile to a further set of sub-tiles from the highest data layer to a lowest data layer.

At 412, pulse data corresponding to each of the plurality of sub-tiles of the lower data layer is recursively generated based on the pulse data associated with each of the plurality of tiles in a higher data layer of the plurality of data layers. Thus, the pulse data of a given tile in a given data layer is used to generate the pulse data of each of the sub-tiles from which the given tile is divided in the next lower data layer. Specifically, the pulse data of the given tile can be range-aligned to an approximate center point of each of the sub-tiles of the next lower data layer, and can then be low-pass filtered and decimated to generate the pulse data of the given sub-tile. At 414, the pulse data associated with each of the plurality of tiles and each of the plurality of sub-tiles in each of the plurality of data layers can be stored in a plurality of buffers of a memory. Upon the buffers of a given data layer overflowing, the associated tile processing controller can generate partial sets of pulse data for the respective sub-tiles of the next lower data layer, such that the pulse data in the overflowing buffers can be overwritten. At 416, a radar image of the target region is generated based on the pulse data corresponding to each of the plurality of sub-tiles associated with a lowest data layer of the plurality of data layers. The radar image can be generated as a back projection radar image.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A synthetic aperture radar (SAR) system comprising:
   a radar transmitter configured to generate a plurality of radar transmission pulses;
   a radar receiver coupled to a radar aperture and configured to receive a plurality of reflected radar pulses corresponding to the plurality of radar transmission pulses having been reflected from a target region;
   a processing controller configured to divide the target region into a plurality of tiles and to process a portion of the plurality of reflected radar pulses to generate pulse data corresponding to a respective one of the plurality of tiles in a highest data layer of a plurality of data layers, and to conduct a plurality of iterations, each corresponding to one of the plurality of data layers, of dividing each of the plurality of tiles into a plurality of sub-tiles corresponding to a lower data layer and to recursively process the pulse data associated with each of the plurality of tiles in a higher data layer to generate pulse data corresponding to each of the plurality of sub-tiles of the lower data layer; and
   an image processor configured to generate a radar image of the target region based on the pulse data corresponding to each of the plurality of sub-tiles associated with a lowest data layer of the plurality of data layers.

2. The system of claim 1, wherein the processing controller comprises:
   a range alignment controller configured to range-align the pulse data corresponding to a given tile in a higher data layer to an approximate center of a given one of the plurality of sub-tiles of the lower data layer and to range-reduce the range-aligned pulse data;
   a low-pass filter (LPF) configured to filter out high-frequency components of the range-aligned pulses of the pulse data corresponding to tiles other than the given tile; and
   a decimator configured to remove a fraction of the filtered range-aligned pulses of the pulse data to generate the pulse data corresponding to the given one of the plurality of sub-tiles of the lower data layer.

3. The system of claim 2, wherein the range alignment controller is configured to range-align the pulse data to the approximate center of the given one of the plurality of sub-tiles for each pulse of the pulse data and to shift a phase associated with each pulse of the pulse data to simulate zero Doppler-shift at the approximate center of the given one of the plurality of sub-tiles.

4. The system of claim 2, wherein the processing controller is configured to add at least one of dummy data and dummy pulses to the range-aligned pulse data, such that the LPF is configured to remove the at least one of the dummy data and dummy pulses to substantially mitigate deleterious edge-effects of the filtered pulse data.

5. The system of claim 2, wherein the LPF is configured as a finite impulse response (FIR) filter that is programmed to include a pass-band between 0 Hz and a first frequency, a stop-band between a second frequency and a Nyquist frequency associated with a frequency of the plurality of reflected radar pulses, and a transition-band between the first frequency and the second frequency, the transition-band being configured to filter oversampled pulse data corresponding to the plurality of sub-tiles in each of the plurality of data layers.

6. The system of claim 1, wherein the image processor is configured as a back-projection image processor configured to generate a range between the radar aperture and each of a plurality of portions of the target region corresponding to a pixel of the radar image, to interpolate a time of arrival of each of the plurality of reflected radar pulses to the radar aperture based on the range, and to adjust a phase associated with each of the plurality of reflected radar pulses at the range.

7. The system of claim 6, wherein the back projection image processor is configured to generate the range from a low-order approximation based on a range from the aperture to an approximate center of a given sub-tile associated with a lowest data layer of the plurality of data layers and a normalized vector associated with each pulse of the pulse data associated with each respective one of the plurality of sub-tiles in the lowest data layer at an approximate center of the respective one of the plurality of sub-tiles to each pixel in the respective one of the plurality of sub-tiles.

8. The system of claim 1, wherein the processing controller is programmed to selectively designate an area within the target region to be imaged, such that upon determining that the plurality of sub-tiles associated with a given one of the plurality of tiles of a higher data layer are outside of the designated area, the processing controller excludes the given one of the plurality of tiles with respect to processing the portion of the plurality of reflected radar pulses to generate the pulse data corresponding to the given one of the plurality of tiles.

9. The system of claim 1, wherein the image processor is further configured to generate a plurality of radar images of the target region based on a respective plurality of unique subsets of the pulse data corresponding to each of the plurality of sub-tiles associated with the lowest data layer of the plurality of data layers.

10. The system of claim 1, wherein the processing controller is further configured to increase a number of pulses corresponding to the pulse data at each of the plurality of data layers corresponding to a given one of the plurality of tiles having a first range from the radar aperture relative to a second one of the plurality of tiles having a second range from the radar aperture that is less than the first range.

11. The system of claim 1, wherein radar transmitter is configured to continuously generate the plurality of radar transmission pulses, and wherein the processing controller is further configured to discard the pulse data corresponding to each of the plurality of tiles in the highest data layer that move to beyond a first predetermined threshold distance and to process reflected radar pulses to generate pulse data corresponding to additional tiles and associated additional sub-tiles in the plurality of data layers that move to within a second threshold distance, the image processor adding image data associated with the additional tiles to the radar image of the target region based on the pulse data corresponding to each of the plurality of sub-tiles associated with the lowest data layer.

12. The system of claim 1, further comprising a memory system configured to store the pulse data associated with each of the plurality tiles in the highest data layer and each of the plurality of sub-tiles in each of the plurality of data layers in a plurality of buffers, and wherein, upon a first one of the plurality of buffers associated with a respective one of the plurality of tiles being full, the processing controller can be configured to begin generating the pulse data corresponding to each of the respective plurality of sub-tiles of the lower data layer based on the pulse data stored in the first one of the plurality of buffers, such that the pulse data stored in the first one of the plurality of buffers can be subsequently overwritten with remaining pulse data associated with the respective one of the plurality of tiles.

13. A method for synthetic aperture radar (SAR) imaging, the method comprising:
generating a plurality of radar transmission pulses;
receiving a plurality of reflected radar pulses at a radar aperture, the plurality of reflected radar pulses corresponding to the plurality of radar transmission pulses having been reflected from a target region;
dividing the target region into a plurality of tiles associated with a highest data layer of a plurality of data layers;
generating pulse data corresponding to a respective one of the plurality of tiles in the highest data layer based on a portion of the plurality of reflected radar pulses;
repeatedly dividing each of the plurality of tiles into a plurality of sub-tiles associated with a lower data layer of the plurality of data layers;
recursively generating pulse data corresponding to each of the plurality of sub-tiles of the lower data layer based on the pulse data associated with each of the plurality of tiles in a higher data layer of the plurality of data layers;
storing the pulse data associated with each of the plurality of tiles and each of the plurality of sub-tiles in each of the plurality of data layers in a plurality of buffers of a memory; and
generating a radar image of the target region based on the pulse data corresponding to each of the plurality of sub-tiles associated with a lowest data layer of the plurality of data layers.

14. The method of claim 13, wherein generating the pulse data comprises:
range-aligning the pulse data corresponding to a given tile in a higher data layer to an approximate center of a given one of the plurality of sub-tiles of the lower data layer;
range-reducing the range-aligned pulse data to the given one of the plurality of sub-tiles of the lower data layer;
filtering out components of the range-aligned and range-reduced pulses of the pulse data corresponding to tiles other than the given tile; and
decimating the filtered range-aligned pulses of the pulse data.

15. The method of claim 13, wherein generating the image comprises:
generating a range from a low-order approximation based on a range from the radar aperture to an approximate center of the respective one of the plurality of sub-tiles in the lowest data layer to each of a plurality of portions of the target region and a normalized vector associated with each pulse of the pulse data;
interpolating a time of arrival of each of the plurality of reflected radar pulses to the radar aperture based on the range; and
adjusting a phase associated with each of the plurality of reflected radar pulses at the range.

16. The method of claim 13, wherein generating the radar image comprises generating a plurality of radar images of the target region based on a respective plurality of unique subsets of the pulse data corresponding to each of the plurality of sub-tiles associated with the lowest data layer of the plurality of data layers.

17. A synthetic aperture radar (SAR) system comprising:
a radar transmitter configured to generate a plurality of radar transmission pulses;
a radar receiver coupled to a radar aperture and configured to receive a plurality of reflected radar pulses corresponding to the plurality of radar transmission pulses having been reflected from a target region;
a processing controller configured to divide the target region into a plurality of tiles, to range-align a portion of the plurality of reflected radar pulses to an approximate center of a given one of the plurality of tiles, to filter out components of the range-aligned pulses corresponding to tiles other than the given tile, and to decimate the filtered range-aligned pulses to generate pulse data corresponding to the given one of the plurality of tiles in a highest data layer of a plurality of data layers, the processing controller being further configured to conduct a plurality of iterations, each corresponding to one of the plurality of data layers, of dividing each of the plurality of tiles into a plurality of sub-tiles corresponding to a lower data layer, to range-align the pulse data associated with each of the plurality of tiles in a higher data layer to an approximate center of a given sub-tile, to filter out components of the range-aligned pulse data corresponding to sub-tiles other than the given sub-tile, and to decimate the filtered pulse data to generate pulse data corresponding to the given sub-tile in the lower data layer; and
a back projection image processor configured to generate a radar image of the target region based on the pulse data corresponding to each of the plurality of sub-tiles associated with a lowest data layer of the plurality of data layers.

18. The system of claim 17, wherein back projection image processor is configured to generate a range from a low-order approximation based on a range from the aperture to an approximate center of a given sub-tile associated with a lowest data layer of the plurality of data layers and a normalized vector associated with each pulse of the pulse data associated with each respective one of the plurality of sub-tiles in the lowest data layer at an approximate center of the respective one of the plurality of sub-tiles to each pixel in the respective one of the plurality of sub-tiles, to interpolate a time of arrival of each of the plurality of reflected radar pulses to the radar aperture based on the range, and to adjust a phase associated with each of the plurality of reflected radar pulses at the range.

19. The system of claim 17, wherein the processing controller is programmed to selectively designate an area within the target region to be imaged, such that upon determining that the plurality of sub-tiles associated with a given one of the plurality of tiles of a higher data layer are outside of the designated area, the processing controller excludes the given one of the plurality of tiles with respect to processing the portion of the plurality of reflected radar pulses to generate the pulse data corresponding to the given one of the plurality of tiles.

20. The system of claim 17, wherein the processing controller is further configured to increase a number of pulses corresponding to the pulse data at each of the plurality of data layers corresponding to a given one of the plurality of tiles having a first range from the radar aperture relative to a second one of the plurality of tiles having a second range from the radar aperture that is less than the first range.

* * * * *